United States Patent [19]

Froehly et al.

[11] Patent Number: 5,045,689
[45] Date of Patent: Sep. 3, 1991

[54] METHOD OF ANALYZING GUIDED OPTICS COMPONENTS, OPTICAL FIBERS OR OPTICAL GUIDE NETWORKS BY TIME REFLECTOMETRY AND REFLECTOMETER IN THE TIME SPHERE

[76] Inventors: Claude Froehly, 25 Rue des Sablons, 87100 Limoges; Paul Facq, 73 Rue des Fougéres, 87350 Panazol; Dominique Pagnoux, 29 Avenue du Président Coty; Pierre Faugeras, 15 rue Camille St. Saens, both of 87000 Limoges, all of France

[21] Appl. No.: 450,689

[22] Filed: Dec. 14, 1989

[30] Foreign Application Priority Data

Dec. 14, 1988 [FR] France ................................ 88 16459

[51] Int. Cl.$^5$ ................................................ H01J 5/16
[52] U.S. Cl. ................................ 250/227.15; 356/73.1
[58] Field of Search ...................... 250/227.14, 227.15, 250/227.16, 231.10; 356/73.1

[56] References Cited

U.S. PATENT DOCUMENTS

| | | |
|---|---|---|
| 4,548,494 | 10/1985 | Geckeler et al. |
| 4,794,249 | 12/1988 | Beckmann et al. |
| 4,826,314 | 5/1989 | Comte ............................. 356/73.1 |
| 4,827,317 | 5/1989 | Mizushima et al. ............. 356/73.1 |
| 4,875,772 | 10/1989 | Gentile ........................... 356/73.1 |
| 4,899,043 | 2/1990 | Mochizuki et al. ............. 356/73.1 |

FOREIGN PATENT DOCUMENTS

0238134A2 9/1987 European Pat. Off.
2393287 7/1980 France.

Primary Examiner—David C. Nelms
Assistant Examiner—Khaled Shami
Attorney, Agent, or Firm—Hill, Van Santen, Steadman & Simpson

[57] ABSTRACT

A method and reflectometer used to analyze guided optical components, optical fibers or optical guide networks by time reflectometry in a time sphere. The method comprises steps of creating a light probe signal, feeding the light probe signals into the guide connected to the system, creating a pumped signal, obtaining a backscattered response signal from the system, sampling the backscattered response signal by interacting the pump signal therewith to produce a sampled signal, and receiving the sampled signal with a photodetector, which is blind to the pump signal and the backscattered response signal and will recompose the backscattered response signal from the sampled signal. The reflectometer has a unit for forming the light probe signal, a light flow separator device for injecting the probe signal into a guide and extracting a backscattered response signal therefrom, a unit for analyzing the backscattered response signal which includes a unit for producing a light pump signal, a unit causing interaction of the pump signal with the backscattered response signal to provide an optical sampling of the response signal and produce a sample light signal, a photodetector receiving the sampled light signal and insensitive to the pump signal and to the backscattered response signal, an electrical unit for processing and storing the output of the photodetector and for recomposing the backscattered response signal therefrom.

10 Claims, 4 Drawing Sheets

METHOD OF ANALYZING GUIDED OPTICS COMPONENTS, OPTICAL FIBERS OR OPTICAL GUIDE NETWORKS BY TIME REFLECTOMETRY AND REFLECTOMETER IN THE TIME SPHERE

Optical reflectometry in the time sphere or time domain reflectometry makes it possible to analyse guided optics components, optical fibres or optical guide networks. It is for example used for evaluating insertion losses of connectors and losses at the splices, determining fibre section lengths, localizing and identifying defects and evaluating the attenuation per unit length.

According to its traditional principle, a light pulse called a probe pulse is injected into an optical guide connected to the system which it is desired to analyse. During its propagation, a small part of the optical power of this pulse is backscattered by the refraction index inhomogeneities of the system to be analyzed, by its defects and by the dioptres it meets, by joints and connecting components (connectors, couplers, attenuators . . . ).

The backscattered response signal constitutes a signature of the system and comprises characteristics of all its elements.

It is received by a photodetector and it is the corresponding electric signal, delivered by a detection-amplification block which is processed and displayed. Representation of the signal from the detection-amplification and processing operations will be designated by "backscatter trace".

The quality of the reflectometer used in this method depends both on its measurement dynamics and its resolution power.

Resolution is the capacity of the reflectometer to dissociate the contribution to the backscattered signal of the defects, dioptres or components close to one another. It is all the better the shorter the duration of the probe pulses and the wider the detection-amplification passband.

The dynamics, expressed in decibels, is the maximum value of the signal to noise ratio recorded at the beginning of the backscatter trace. It is all the higher the more the probe pulses are energetic (so of long duration) and the narrower the passband of the detection-amplification unit.

For a given system, the length capable of being analyzed by a reflectometer (range) increases with the dynamics thereof.

SUMMARY OF THE INVENTION

High dynamics and high resolution requirements are apparently contradictory and have led up to present to a compromise between these two qualities. Some of the known apparatus privilege the dynamics to the detriment of the resolution whereas others prefer to offer a better resolution with lower dynamics.

The purpose of the present invention is to provide a method of analyzing guided optics components, optical fibres or optical guide networks by time reflectometry offering simultaneously high dynamics and high resolution.

It is also an object of the present invention to provide a reflectometer for implementing this method.

It is an important contribution of the invention not to have accepted the generally admitted limitation and to have proposed means for overcoming it.

For this, the method of analyzing guided optics components, optical fibres or optical guide networks by reflectometry in the time sphere of the invention is of the type in which a light probe signal formed of short periodic pulses is fed into a guide connected to the system to be analyzed, and the backscattered response signal is analyzed. It is characterized in that the backscattered response signal is sampled by interaction with the light signal called pump signal, formed of short periodic pulses so as to produce a new signal called sampled signal received by a photodetector which is blind to the pump signal and to the backscattered response signal. The repetition frequency of the pulses of the pump signal is close to that of the pulses of the probe signal or close to a multiple or a sub-multiple of this frequency. The backscattered response signal is recomposed from signal samples delivered by the photodetector.

The reflectometer in the time sphere for analyzing guided optics components, optical fibres or optical guide networks is of the type comprising means for transmitting a probe light signal formed of short periodic pulses, a light flow separating device for injecting the probe signal into a guide connected to the system to be analyzed and extracting the backscattered response signal and means for analyzing the backscattered response signal.

According to the invention, the means for analyzing the backscattered response signal comprise means for producing a light pump wave formed of short periodic pulses, the repetition frequency of these pulses being close to the repetition frequency of the probe signal or close to a multiple or a sub-multiple of this frequency, means for causing the pump signal to interact with the backscattered response signal so as to provide optical sampling of the backscattered response signal and produce a sampled light signal, a photodetector receiving the sampled light signal and insensitive to the pump signal and to the backscattered response signal, and an electric unit processing and storing the photodetected samples and recomposing the backscattered response signal.

BRIEF DESCRIPTION OF THE DRAWINGS

The invention will be described in greater detail hereafter with reference to the figures in which:

FIG. 4B being a trace of a backscattered optical signal relative to the probe signal; FIG. 4C being a trace of the optical signal resulting from sampling; FIG. 4D being a trace of the electric signal produced by the photodetector when receiving the sampled optical signal; and FIG. 4E being a trace of the electric signal produced by the electronic unit after recomposition.

DESCRIPTION OF THE PREFERRED EMBODIMENTS

Figure 1:
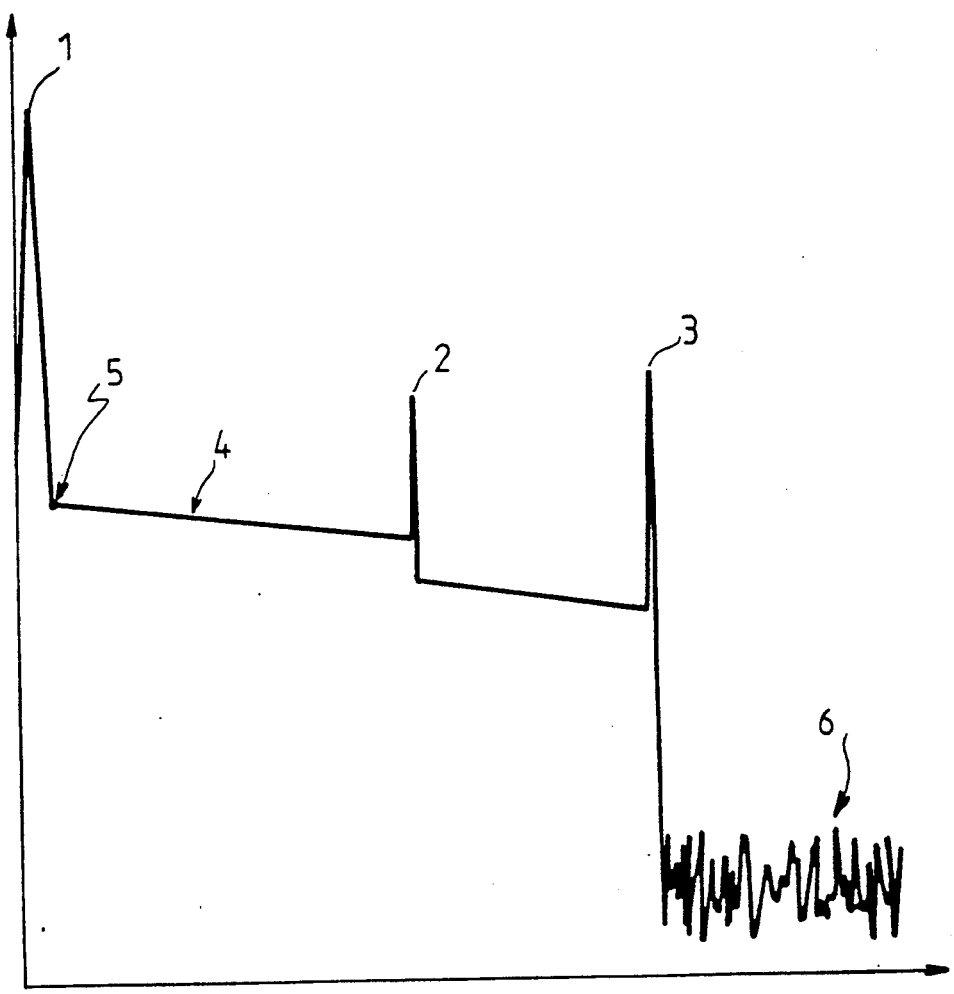
FIG. 1 shows a backscatter trace.
Figure 2:
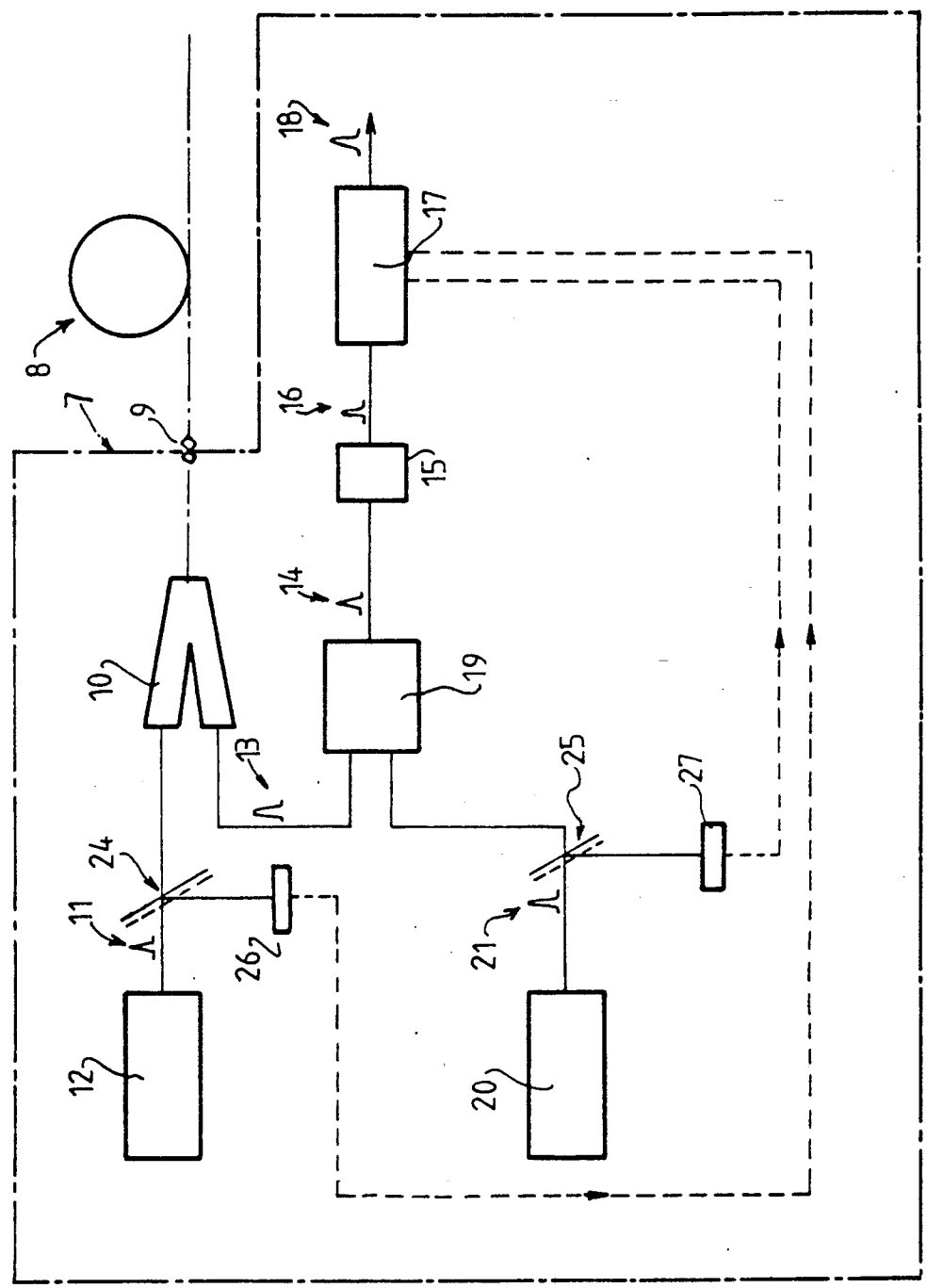
FIG. 2 is a general diagram of the method of the invention.
Figure 3:
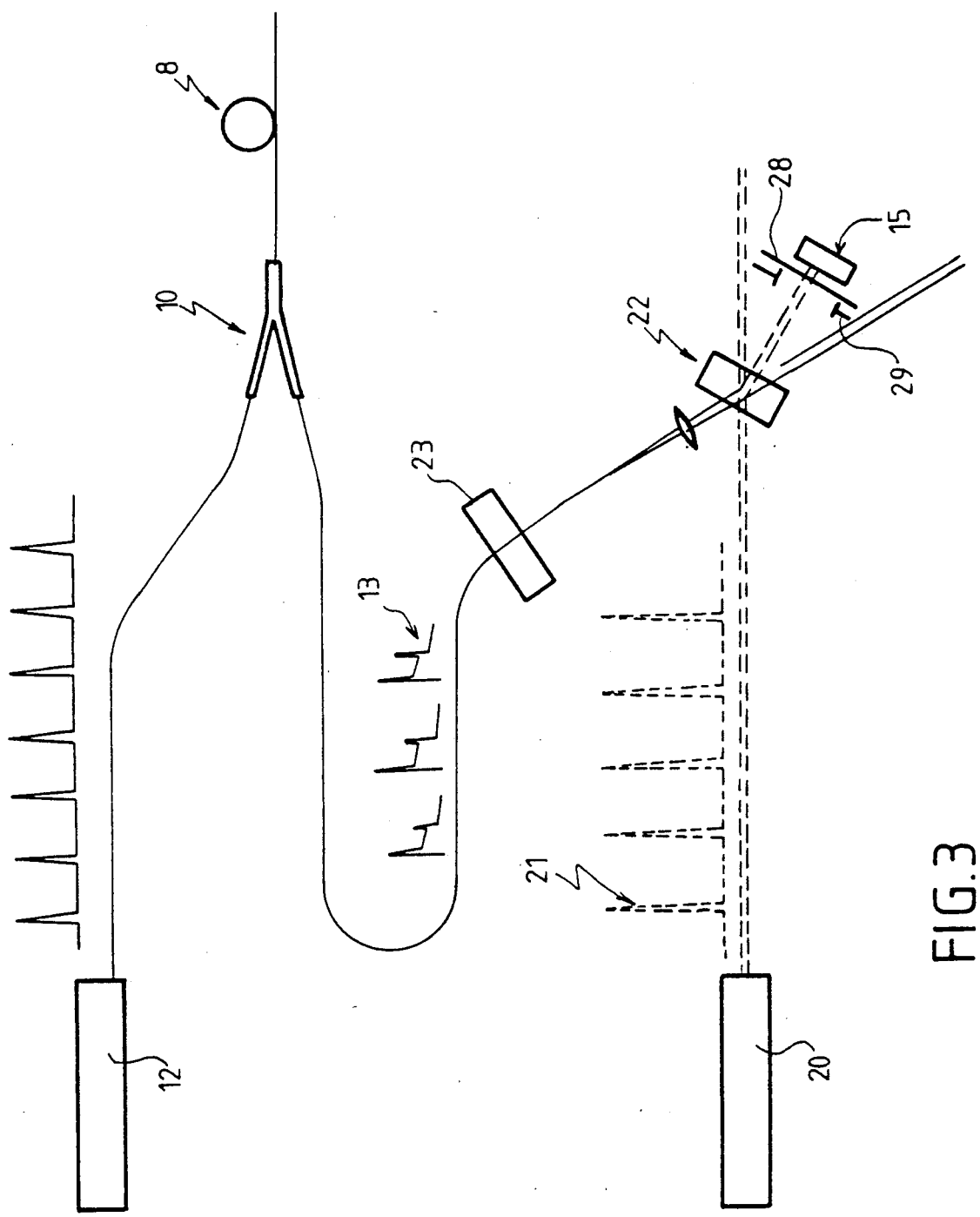
FIG. 3 shows the reflectometer of the invention.
Figure 4A:
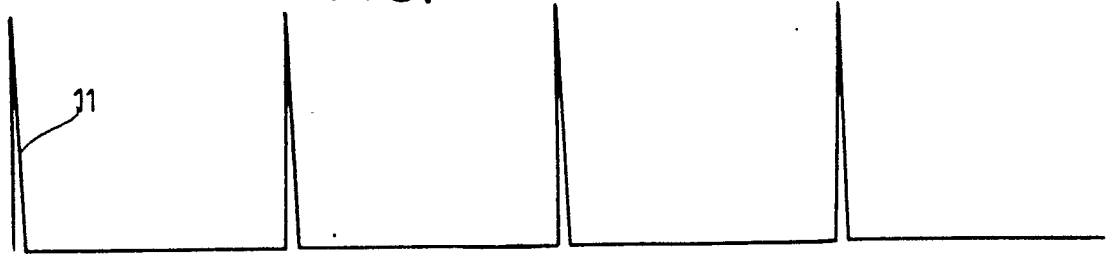
FIGS. 4A–4E are general explanatory diagrams or traces of the method of the invention with FIG 4A being a trace of the probe signal.
Figure 4B:
Figure 4C:
Figure 4D:
Figure 4E:
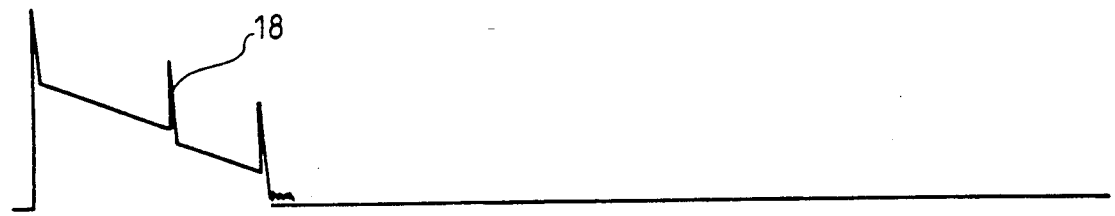

The backscatter trace shown in FIG. 1 comprises one or more peaks 1–3 generated by the probe signal 11 during its propagation through the system 8.

Between these peaks 1 to 3, the decrease of the trace in zone 4 depends on the attenuation per unit length of the fibre.

The noise of the detection-amplification unit is shown at 6.

Peak 1 is produced by the reflection of the probe pulse 11 at the input to the system 8. The signal to noise ratio at point 5 at the foot of peak 1 indicates the dynamics of the reflectometer.

Reflectometer 7 is intended to analyse the assembly 8 which is formed of any assembly of guided optics elements. Very often it is an assembly of fibres, optical guide networks and different components, connectors, couplers, attenuators . . .

Such an assembly may be an element of an optical fibre telecommunications network.

Connection of reflectometer 7 to the assembly 8 is provided by connector 9. A Y coupler 10 feeds a light signal 11 emitted by source 12 into assembly 8 and extracts the backscattered signal 13.

Traditionally, this backscattered signal is detected directly then amplified, sampled electronically, processed in order to increase the signal to noise ratio and displayed.

On the contrary, in accordance with the invention, this backscattered signal 13 is sampled optically so as to produce a light signal 14 which is itself transformed by photodetector 15 into an electric signal 16. The processing unit 17 then recomposes an electric signal 18 corresponding to the backscattered optical signal 13. This signal 18 is then either displayed or used directly for any desired subsequent processing.

Sampling is provided by an opto-optical gate system 19 controlled by a laser or by a laser diode 20 producing pulses 21. The opto-optical gate 19 comprises a non-linear crystal 22 and laser 20 emits light pulses 21 forming a periodic pump signal whose repetition frequency is close to that of the pulses of the probe signal 11 or close to a multiple or a sub-multiple of this frequency.

The effect of the probe signal 11 on the optical guide system 8 is to produce backscattered optical signals 13. Each of these signals has a duration appreciably greater than that of a pulse of the probe signal 11. The form of these signals depends on the nature of the elements producing the backscatter. The opto-optical gate 19 produces a sampled optical signal 14 which is received by the photodetector 15. Each of signals 14 is deformed by the transfer function of detector 15 and so is appreciably widened. However, the electronic processing of this signal provided by the processing unit 17 makes it possible to overcome such widening and to reconstitute an electric signal which is substantially homothetic of the optical signal 13. For this, the processing unit 17 may for example assign to each pulse a value which depends on the energy of the corresponding pulse 16.

The method of the invention is independent of the transfer function of detector 15 and a detection-amplification unit having a small passband may be used.

It is sufficient for the passband to be the inverse of the recurrence period of the pump pulses 11 and so very much less than that required by prior art methods which must be of the order of the inverse of the duration of the probe pulses. In fact, the resolution of the reflectometer is no longer set by the passband of the detection-amplification unit but by the performances of the opto-optical gate which uses ultra-rapid non-linear optics phenomena.

According to the invention, the very high rate of extinction of gate 19, combined with the low value of the passband of the detection-amplification unit, leads to much greater dynamics than that permitted by the prior art devices and methods, without having to compromise on the resolution power.

Sources 12 and 20 are also capable of delivering brief and coherent light pulses. They are preferably lasers or laser diodes.

The laser diodes for providing the probe pulses preferably emit signals at wavelengths of 0.85 microns, 1.3 microns or 1.55 microns which are the wavelengths usually for optical fibres.

Different types of opto-optical gates may be used, preferably a non-linear crystal of order 2 will be used, for example a KDP crystal which provides a non-colinear parametric frequency conversion. In order to improve the signal to noise ratio and avoid possible parasite signals, the photodetector, which is of course sensitive to the frequency generated by the crystal, is made insensitive both to the backscattered response signal and to the pump signal. For this, the photodetector is preceded by a chromatic filter 28 or a spatial filter 29 or simultaneously by both.

If T1 is the time separating two probe signal pulses 11, the repetition frequency f1 of the probe source 12 is defined by $f1 = 1/T1$. Similarly, if T2 is the time separating two pulses of the pump signal 21, the repetition frequency f2 of the pump laser 20 is defined by $f2 = 1/T2$. f2 is chosen so that $f2 = kf1 + f$, k being an integer or the inverse of an integer. Then $T1 = kT2 + T$. This makes it possible to obtain a resolution related to T, since two successive samples deliver information concerning two points of the fibre spaced apart by c/N1 T. c represents the speed of light in a vacuum and N1 the group index of the fibre.

In a preferred embodiment, an optical amplifier 23 is inserted between the optical coupler 10 and the opto-optical gate 19 which permits the use of low levels of the backscattered signal 13.

Fluctuations of the level either of the probe signal 11 or of the pump signal 21 may produce undesirable effects on the backscattered sampled light signal 13. These effects may be offset at the level of the electronic processing unit from the previous acquisition of the level of the transmitted signal 11 and that of the pump signal 21. For that, separators 24, 25 are placed in the output of sources 12 and 20 for taking off a small part of the transmitted signals. The rear signals of sources 12 and 20 may also be used, when these sources are lasers. The signals thus taken are fed to detectors 26, 27 which deliver to the processing unit 17 electric signals characteristic of the power of the probe and pump pulses respectively.

In some special configurations, for acquisition of isolated samples, the repetition frequency of the pump pulses will be made equal to that of the pulses of the probe signal, or equal to a whole multiple of this frequency.

When the sampled signal 14 has a low power level, it is increased by inserting an optical amplifier 23 either between coupler 10 and sampler 19,20 or after sampler 19,20 and before the detector 15.

The use of an opto-optical sampler 19,20 then makes it possible to analyse recurrent optical signals 13 even if they are formed of brief low power pulses with high dynamics and high resolution, while overcoming the constraints imposed by the pulsed response of the detection-amplification unit 15.

What is claimed is:

1. A method of analyzing a system comprising guided optical components, optical fibers or optical guide networks by a reflectometry in a time sphere, said method comprising the steps of creating a light probe signal formed of short periodic pulses, feeding the light probe signal into a guide connected to the system; creating a pump signal being formed of a short periodic light pulse with a repetition frequency of the pulses of the pump signal being a frequency that is selected to be one close to the signals of the probe signal, close to a multiple of the frequency of the probe signal and close to a sub-multiple of said frequency of the probe signal, obtaining a backscatter response signal from the system, sampling the backscattered response signal by interacting the pump signal therewith to produce a sampled signal, receiving the sampled signal with a photodetector which is blind to the pump signal and the backscatter response signal, said photodetector recomposing the backscattered response signal from said sampled signal.

2. A reflectometer in a time sphere for analyzing a system containing guided optical components, optical fibers or optical guide networks, said reflectometer comprising means for forming a probe light signal formed of short periodic pulses, a light flow separator device for injecting the probe signals into a guide connected to the system to be analyzed and extracting a backscattered response signal therefrom, means for analyzing the backscattered response signal, said means for analyzing comprising means for producing a light pump signal formed of short periodic pulses having a repetition frequency close to one of the repetition frequency, a multiple of the repetition frequency, and a sub-multiple of the repetition frequency of the probe signal, means causing interaction of the pump signal with the backscatter response signal to provide optical sampling of the response signal and produce a sampled light signal, a photodetector receiving the sampled light signal and insensitive to the pump signal and to the backscattered response signal, and an electronic unit processing and storing the output of the photodetector and recomposing the backscattered response signal therefrom.

3. A reflectometer in a time sphere for analyzing a system including guided optics components, optical fibers, and optical guide networks, said reflectometer comprising: means for creating a probe light signal formed of short periodic pulses, a light flow separator device for injecting the probe signal into a guide connected to the system to be analyzed and extracting a backscattered response signal therefrom, and means for analyzing the backscattered response signal, said means for analyzing comprising means for producing a light pump signal formed of short periodic pulses with a repetition frequency of the pulses being selected to be close to the repetition-frequency of the probe signal, close to a multiple of the frequency of the probe signal, and a sub-multiple of the frequency of the probe signal; means causing interaction of the pump signal with the backscattered response signal so as to provide optical sampling of the response signal and produce a sampled light signal; a photodetector receiving the sampled light signal and being insensitive to the pump signal and to the backscattered response signal, an electrical unit processing and storing the photodetected samples and recomposing the backscattered response signal, the means for creating the probe signal and the means for producing the pump signal being a laser, the optical wavelengths of the probe signal, of the pump signal and of the sampled light signal being different from each other, the photodetector being preceded by filtering means in the spatial and chromatic spheres, or in only one of these spheres, which filter means improves the insensitivity to the backscattered response signal and to the pump signal, the means causing interaction of the pump signal with the backscattered response signal comprising a non-linear crystal of an order of two or three or a non-linear effect optical guide of the order two or three, a power level of the sampled signal being increased by direct optical amplification of the backscattered response signal between the coupler and the sampler or the sampled light between the sampler and the photodetector or both said signals, said device including means for offsetting the effect of the fluctuations of the probe and the pump signal on the detected response signal and the repetition signal of the pump pulses may be equal to that of the pulses of the probe signal or equal to a multiple or sub-multiple thereover for the acquisition of isolated samples.

4. Reflectometer according to claim 2, wherein the means creating the probe signal and the means producing the pump signal are lasers or laser diodes.

5. Reflectometer according to claim 2, wherein the optical wavelengths of the probe signal, the pump signal and the sampled light signal are different from each other.

6. Reflectometer according to claim 5, wherein photodetector is preceded by filtering means in the spatial and chromatic spheres, or in one only of these spheres, which improves its insensitivity to the backscattered response signal and to the pump signal.

7. Reflectometer according to claim 2, wherein the means causing interaction of the pump signal with the backscattered response signal comprise a non-linear crystal of order two or three or a non-linear effect optical guide of order two or three.

8. Reflectometer according to claim 2, wherein the power level of the sampled signal is increased by direct optical amplification of the backscattered response signal, between the coupler and the sampler or the sampled light signal between the sampler and the photodetector or both these signals.

9. Reflectometer according to claim 2, which includes means for offsetting the effects of the fluctuations of the probe and pump signals on the detected response signal.

10. Reflectometer according to claim 2, wherein the repetition frequency of the pump pulses may be made equal to that of the pulses of the probe signal, or equal to a multiple or a sub-multiple thereof, for the acquisition of isolated samples.

* * * * *